United States Patent [19]

Delvaux et al.

[11] Patent Number: 5,154,955
[45] Date of Patent: * Oct. 13, 1992

[54] FIBER-REINFORCED CEMENT COMPOSITION

[75] Inventors: Pierre Delvaux, Bromptonville; Normand Lesmerises, Rock Forest, both of Canada

[73] Assignee: Ceram-Sna Inc., Sherbrooke, Canada

[*] Notice: The portion of the term of this patent subsequent to Jan. 15, 2008 has been disclaimed.

[21] Appl. No.: 410,481

[22] Filed: Sep. 21, 1989

[51] Int. Cl.$^5$ .............................................. B28B 23/02
[52] U.S. Cl. .................... 428/34.5; 428/36.1; 428/325; 428/364; 428/443; 428/454; 106/703; 106/699; 106/701; 252/62
[58] Field of Search .................. 428/36.1, 34.5, 312.4, 428/312.6, 325 C, 364 C, 443 C, 454 C; 106/90, 703, 699; 524/5; 501/95, 155; 252/62

[56] References Cited

U.S. PATENT DOCUMENTS

| | | | |
|---|---|---|---|
| 1,172,907 | 2/1916 | Rust | 106/99 |
| 3,244,927 | 12/1965 | Brown et al. | 162/155 |
| 3,353,975 | 11/1967 | Shannon et al. | 106/65 |
| 3,367,871 | 2/1968 | Mueller et al. | 252/62 |
| 3,565,650 | 2/1971 | Cordon | 106/97 |
| 3,616,173 | 10/1971 | Green et al. | 161/162 |
| 3,661,603 | 5/1972 | Nicol | 106/90 |
| 3,682,667 | 8/1972 | Roberts et al. | 106/67 |
| 3,718,491 | 2/1973 | Yates | 106/84 |
| 3,809,566 | 5/1974 | Revord | 106/110 |
| 3,933,515 | 1/1976 | Yang | 106/99 |
| 3,954,556 | 5/1976 | Jackson et al. | 162/145 |
| 3,974,024 | 8/1976 | Yano et al. | 162/101 |
| 4,101,335 | 7/1978 | Barrable | 106/99 |
| 4,107,376 | 8/1978 | Ishikawa | 428/306 |
| 4,119,591 | 10/1978 | Aldrich et al. | 260/17.2 |
| 4,128,524 | 12/1978 | Barnett et al. | 260/39 |
| 4,255,197 | 3/1981 | Peralta et al. | 106/41 |
| 4,274,881 | 6/1981 | Langton et al. | 106/98 |
| 4,277,596 | 7/1981 | Lalancette | 528/106 |
| 4,320,022 | 3/1982 | Aitcin | 252/62.59 |
| 4,363,738 | 12/1982 | Kummermehr | 252/62 |
| 4,414,031 | 11/1983 | Studinka et al. | 106/90 |
| 4,430,157 | 2/1984 | Lalancette | 162/145 |
| 4,461,643 | 7/1984 | Kaufman | 106/36 |
| 4,519,811 | 5/1985 | Lalancette et al. | 51/309 |
| 4,604,140 | 8/1986 | Lalancette et al. | 106/38.9 |
| 4,710,309 | 12/1987 | Miller | 252/62 |
| 4,722,866 | 2/1988 | Wilson et al. | 428/411.1 |
| 4,907,428 | 3/1990 | Nakashima et al. | 70/264 |
| 4,985,164 | 1/1991 | Delvaux et al. | 252/62 |

FOREIGN PATENT DOCUMENTS

| | | |
|---|---|---|
| 1235149 | 4/1988 | Canada . |
| 47728 | 3/1982 | European Pat. Off. . |
| 57-160977 | 10/1982 | Japan . |
| 57-205380 | 12/1982 | Japan . |
| 58-0270784 | 2/1983 | Japan . |
| 1083809 | 10/1967 | United Kingdom . |

Primary Examiner—Ellis P. Robinson
Assistant Examiner—Charles R. Nold
Attorney, Agent, or Firm—Foley & Lardner

[57] ABSTRACT

Disclosed is a fiber-reinforced cement composition particularly useful to make pipes or sheets. This composition comprises up to 70% by weight of a fibrous-like synthetic forsterite obtained by calcination of chrysotile asbestos fibers at a temperature of from 650° C. to 1450° C., said synthetic forsterite having an MgO:SiO2 ratio lower than 1.1, a raw loose density of from 3 to 40 pcf, a thermal conductivity "k" factor of from 0.25 to 0.40 BTU. in/hr. °F. ft$^2$ and a fusion point of from 1600° to 1700° C. The composition also comprises a hydraulic binder, which is preferably Portland cement, and reinforcing fibers such as cellulose, synthetic fibers, glass wool, rock wool or their mixtures, in such an amount as to give sufficient strength to the composition to make it operative.

7 Claims, No Drawings

FIBER-REINFORCED CEMENT COMPOSITION

BACKGROUND OF THE INVENTION

1. Field of the Invention

The present invention relates to a new fiber-reinforced cement composition particularly useful to make sheets and pipes. The invention also relates to the sheets and pipes obtained from such a composition.

2. Brief Description of the Invention

U.S. patent application Ser. No. 246,198 filed on Nov. 8, 1988 now U.S. Pat. No. 4,985,164 in the name of the same Applicant, discloses and claims a fibrous-like synthetic forsterite product which is particularly useful as an insulating material. This product which is presently offered for sale under the trademark FRITMAG and will be called as such hereinafter, is obtained by subjecting chrysotile asbestos fibers of any commercial grade, having an MgO:SiO2 ratio lower than 1:1, to calcination at a temperature of from 650° to 1450° C.

FRITMAG has a raw loose density of from 3 to 40 pounds per cubic foot, a thermal conductivity K factor of from 0.25 to 0.40 BTU. in/Hr. °F.ft2 and a fusion point of about 1600° to 1700° C. It possesses a somewhat fibrous structure ressembling that of the chrysotile asbestos fibers from which it derives, although this fibrous structure has shown to disappear upon rough manipulation, when subjected to pressure, or when mixed with other material. Then, the fibrous structure is lost but the product has and always retains a high insulating value which is substantially superior to granular forsterite and similar to KAOWOOL (trademark) or rockwool.

In the above mentioned U.S. patent application, it is mentioned that FRITMAG may be used as a substitute for asbestos, whenever a fibrous material to be used in bulk and having high insulating qualities is needed. Indeed, FRITMAG is fibrous and has a loose density range substantially identical to asbestos. It also has high insulating properties and is devoided of all the undesirable health problems allegedly attributed to asbestos.

In the above mentioned U.S. patent application, it is also suggested to mix FRITMAG with an inert filler and a binder in order to form an insulating composition adapted to be shot onto any surface to be insulated or to be moulded in the form of slabs for roof insulation. However, no specific example of such a composition is given, except for a short reference made in the specification to a possible mixing with other materials, such as Portland cement. Similarly, no method of manufacturing slabs from such a composition is disclosed, although it is obvious that some of the methods presently used on an industrial scale to manufacture slabs may not be applicable if FRITMAG is part of the combination, because of the change of structure that has been noticed in this product when it is subjected to pressure or mixed with other materials.

SUMMARY OF THE INVENTION

The present invention derives from further studies that have been conducted on FRITMAG since it was first synthetized.

In accordance with the present invention, it has been found that insulating sheets or pipes having good tensile strength and excellent mechanical properties can be obtained from a new fiber-reinforced composition comprising up to 70 by weight of FRITMAG, the balance consisting mainly of:

a hydraulic binder such Portland cement, to which inert fillers or additives may be added whenever desired; and a sufficient amount of organic or mineral reinforcing fibers such as carbon, steel or glass fibers or polyamide, polyester or polypropylene fibers, to give sufficient strength, especially tensile strength, to make the resulting product operative for its intended use.

It has also been surprisingly found that the wet spinning method commonly used for manufacturing asbestos-reinforced cement sheets or pipes, can be used to manufacture insulating sheets or pipes according to the invention, even if FRITMAG which is known to loose its fibrous structure when pressed or mixed with another material, is used in the starting mixture, in place of asbestos, and even if FRITMAG is used in an amount of up to 70% by weight of the composition.

This method which is used industrially worldwidely and is carried out in machines called after their inventor, Mr. HATSCHEK, basically consists of filtering an aqueous suspension containing from 1 to 15% by weight of solids consisting of asbestos fibers and a hydraulic binder through a spinning sieve and recovering on a felt conveyor the green sheet formed on the outer wall of the sieve prior to winding it about a calendering cylinder until the requested thickness is obtained.

To produce a sheet, the green sheet which is wound onto the calendering cylinder is cut, unwound, shaped and allowed to set.

To produce a pipe, the green sheet wound onto the calendering cylinder is allowed to set in place and is slid out of the cylinder.

As indicated hereinabove, the HATSCHEK machine is commonly used to produce asbestos-cement sheets or pipes, from a composition containing from 10 to 15% by weight of asbestos, the balance consisting of cement, preferably Portland cement, and optionally, inert fillers and/or additives. The advantage of using such an asbestos-containing composition as starting material to produce sheets or pipes using an HATSCHEK machine are as follows:

the suspension of cement, asbestos fiber and water is homogeneous;

asbestos fibers have a very strong affinity with the cement in suspension;

because of this homogeneity and affinity, the green sheet which is recovered is also homogeneous and there are very few losses during the spinning step;

the composition is easy to filter and the excess water may be easily removed; and asbestos, because of its fibrous structure, gives good tensile strength to the green sheet and final product.

Numerous studies have been made over the last decade to find a substitute to this composition of asbestos and cement, which might be processed with the existing high productivity machines of the HATSCHEK type. By way of example, numerous compositions have been proposed, containing substitute fibers selected amongst natural fibers such as cellulose, and synthetic fibers of the mineral type, such as rockwool, glasswool, or of the organic type such as polyamide, polyester, polypropylene, polyvinylalcohol or polyacrylic nitrile (see, by way of example, U.S. Pat. No. 4,414,031).

In accordance with the invention, it has been found that FRITMAG can be used with cement to produce a sheet on a HATSCHEK machine, even when FRITMAG is used in an amount of up 70% by weight. More particularly, in accordance with the invention, it has been found that FRITMAG keeps most of the property of asbestos when it is processed in a HATSCHEK machine. Thus, it provides a good homogeneity to suspension, it has a strong affinity with cement; it gives homogeneity to the green sheet; and it reduces as much as possible the loss of solids matter with the filtered water.

It has been found however that FRITMAG is not reinforcing enough and that, accordingly, supplemental, reinforcing fibers must be added to the composition. Advantageously, the amount of reinforcing fibers may be adjusted at will, so as to give sufficient strength, especially tensile strength, to the resulting material to make it operative depending on its intended use. This amount of fibers added to the composition may be very small. Indeed, the addition of such reinforcing fiber is not required by the process of manufacturing, but exclusively by the desiderata of the consumer.

Of course, the same kind of fibers as recited above may be used, including, for example, cellulose, polyacrylic nitrile fiber, glass wool, rockwool and their mixtures.

The hydraulic binder used in the composition according to the invention may be of any type. By hydraulic binder, there is meant any material containing an inorganic cement and/or an inorganic binder or adhesive agent which is capable of hardening when it is hydrated. Examples of such hydraulic binders are, for example, Portland cement, clay-fusion cement, iron Portland cement or any similar material. Use can also be made of silica-derivated cement, such as calcium silicates, to be processed in an autoclave.

In addition, the composition according to the invention may further comprise inert fillers and additives known per se in this very specific field. Examples of such additives are siliceous dust, quartz, crushed stones, kaolin, blast furnace slag, etc.

EXAMPLES

Different tests, including comparative tests, were carried out. Each test comprised the production of a sheet, using a wet spinning machine of the HATSCHEK type, manufactured by the Italian company ISPRA. This machine is capable to produce sheets 120 cm long by 40 cm width. The number of rotation of the calendering cylinder was adjusted to obtain a sheet having a thickness of 0.5 cm.

In each case, 30 cm × 30 cm plates were cut from the sheets and compressed under a pressure of 20 MPa for 15 minutes. These plates were subsequently kept at a temperature of 25° C. under an 100% moisture atmosphere for 28 days.

Then, 18 cm × 3 cm × 0.5 cm test samples were cut from each plate, in order to measure their bending tensile strength. These samples were cut lengthwisely and transversally through each plate in order to take into account the eventual orientation of the fibers as a result of the spinning MACHINE. Each measurement was carried out on 10 samples dried in an autoclave at 120° C. for 12 hours, and on 10 other samples kept in water for 24 hours.

The compositions processed in the HATSCHEK machine are given in Table I hereinafter. The results of the tests that were carried out with the samples obtained from these compositions are given in Table II hereinafter. As will be noted, Table II gives:
 the conditions of operation of the machine;
 the concentration of the suspension fed into the spinning sleeve;
 the amount of fines in the filtration water;
 the number of rotation of the calendering cylinder to obtain a 0.5 cm thick plate;
 the density of the obtained products; and
 the measured bending tensile strengths.
As will be noted, Table II clearly shows that:
 the losses in the filtration water of the suspension containing FRITMAG (see examples 2, 3, 4 and 5) are equal to or lower than those obtained with the comparative composition containing asbestos fibers;
 the composition of example 2 which did not contain reinforcing fibers was processed as easily as the others, but the resulting product was too friable to be tested; and
 the bending tensile strength of the FRITMAG containing composition of examples 3, 4 and 5 are lower than those obtained with the asbestos-containing composition of examples 1, but are very similar to those obtained with the commercial, cellulose-containing cement of example 6.

TABLE I

| COMPARISON TESTS | |
|---|---|
| COMPOSITIONS | PERCENTAGE BY WEIGHT |
| Composition 1 (comparative) | |
| Chrysotile asbestos fibers (type 5R) | 10.5 |
| Portland cement (type 10) | 89.5 |
| Composition 2 (comparative) | |
| FRITMAG | 30 |
| Portland cement (type 10) | 70 |
| Composition 3 | |
| FRITMAG | 49 |
| Cellulose | 2 |
| Portland cement (type 10) | 49 |
| Composition 4 | |
| FRITMAG | 68 |
| Glass fibers | 2 |
| Portland cement (type 10) | 30 |
| Composition 5 | |
| FRITMAG | 30 |
| Glass fibers | 2 |
| Portland cement (type 10) | 68 |
| Composition 6 (comparative) | |
| Cement-cellulose (HARDIFLEX ®) | |

TABLE II

| | COMPOSITIONS | | | | | |
|---|---|---|---|---|---|---|
| | 1 | 2 | 3 | 4 | 5 | 6 |
| OPERATIVE CONDITIONS | | | | | | |
| Concentration of aqueous suspension (g/l) fed to the machine | 86 | 76 | 74 | 51 | 54 | — |
| losses g/l | 20 | 20 | 19 | 7 | 12 | — |
| Number of rotation of calendering cylinder | 57 | 18 | 17 | 13 | 23 | — |
| RESULTS | | | | | | |
| Density | 1.33 | — | 1.52 | 1.40 | 1.40 | 1.28 |
| Bending tensile strength (MPa) | | | | | | |
| Dry | | | | | | |
| cut longitudinally | 29.2 | — | 23.0 | 18.5 | 18.4 | 19.5 |
| cut transversally | 24.4 | — | 20.0 | 16.7 | 17.8 | 16.3 |
| Average | 26.8 | — | 21.5 | 17.6 | 18.7 | 17.9 |
| Saturated | | | | | | |
| cut longitudinally | 24.8 | — | 14.7 | 12.0 | 11.2 | 14.7 |
| cut transversally | 19.2 | — | 11.8 | 10.5 | 10.7 | 10.6 |
| Average | 22.0 | — | 13.2 | 11.3 | 11.0 | 12.7 |

TABLE II-continued

| | COMPOSITIONS | | | | | |
|---|---|---|---|---|---|---|
| | 1 | 2 | 3 | 4 | 5 | 6 |
| Average | 24.4 | — | 17.4 | 14.4 | 14.5 | 15.3 |

We claim:

1. A fiber-reinforced composite material obtained by wet spinning of an aqueous suspension originally containing from 1 to 15% by weight of a composition comprising:

up to 70% by weight of a fibrous synthetic forsterite obtained by calcination of chrysotile asbestos fibers at a temperature of from 650° C. to 1450° C., said synthetic forsterite having an $MgO:SiO_2$ ratio lower than 1.1, a raw loose density of from 3 to 40 pcf, a thermal conductivity "k" factor of from 0.25 to 0.40 BTU in/hr. $°F.ft_2$ and a fusion point of from 1600° to 1700° C.;

a hydraulic binder; and reinforcing fibers in an effective amount to provide sufficient strength to said composite material.

2. The composite material of claim 1, wherein said hydraulic binder is Portland cement.

3. The composite material of claim 1, wherein said reinforcing fibers are selected from the group consisting of cellulose, polyacrylic nitrile fibers, polyvinylalcohol fibers, glass wool, rock wool and their mixtures.

4. The composite material of claim 1, wherein said reinforcing fibers are glass fibers and are present in the composition in an amount of about 2% by weight.

5. The composite material of claim 1, wherein said composition further comprises inert fillers or additives.

6. The composite material of claim 1, wherein said composite material is formed as a sheet.

7. The composite material of claim 1, wherein said composite material is formed as a pipe.

* * * * *